Aug. 12, 1947.    J. D. LANGDON    2,425,332
APPARATUS FOR RESURFACING RUBBER TIRES
Filed Dec. 16, 1942
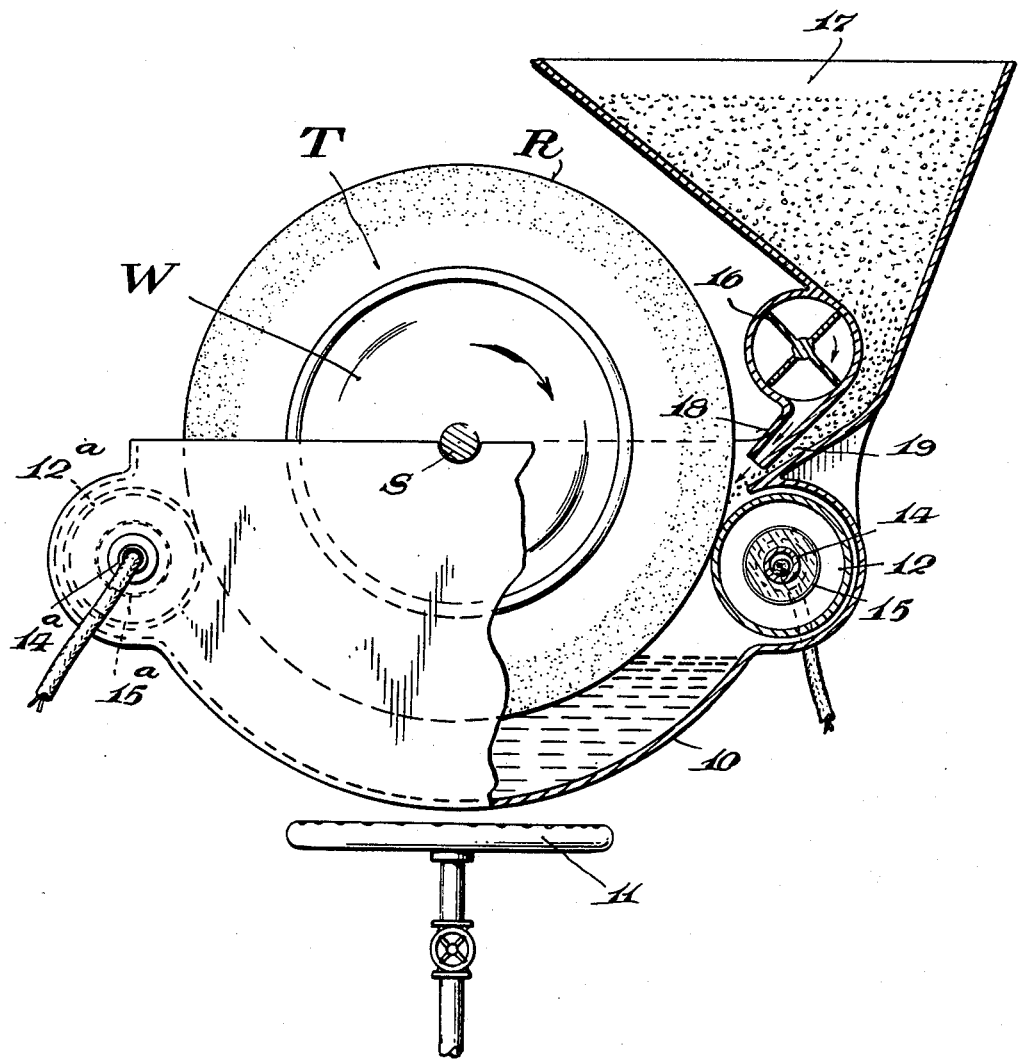
JESSE D. LANGDON, Inventor
By Henry J. Lucke
            Attorney Patented Aug. 12, 1947

2,425,332

UNITED STATES PATENT OFFICE 2,425,332

APPARATUS FOR RESURFACING RUBBER TIRES

Jesse D. Langdon, Brooklyn, N. Y.

Application December 16, 1942, Serial No. 469,275

3 Claims. (Cl. 91—18)

This invention relates to an improved means for retreading or resurfacing rubber tires.

It is an object of the invention to provide improved means whereby rubber tires may be resurfaced or reenforced by plastic materials not of themselves of the nature of rubber, whereby worn vehicle tires may be preserved for additional service without expenditure of "critical" or commercially unavailable materials.

It is an object of the invention to provide an apparatus for reenforcing the tread and side wall portions of rubber tires by a layer of wear-resistant material which will bond with the original rubber of the tire to add to the life thereof.

I have discovered that certain materials when applied to rubber in a fluid or semi-fluid state, will unite with rubber to form a substantially inseparable bond therewith, and will after "curing," possess many of the characteristics of the rubber present in the worn tires or tire carcass.

The material such as asphaltum, with which the tire is to be coated may be given additional strength and resistance to abrasion by the addition of a suitable material or flock such as wire fibres, macerated canvas, cotton or other linters or the like applied to the tire, in any desired quantity, during the operation of retreading the tire.

In the accompanying drawing the figure represents a side elevation partly in section of my apparatus for coating and retreading a worn tire.

Referring to the drawing for a more detailed description of the invention, T is representative of a rubber tire or the like mounted on a rim or wheel W supported for manual or power rotation on the shaft S. The rubber surface R of the tire should be suitably cleaned and prepared for the application of the resurfacing material.

Said wheel W is disposed with respect to a tank 10, within which I place a suitable quantity of a natural or artificial plastic material, of which many of the so-called asphalt materials are examples, and heat said materials to a suitable condition of fluidity as by the illustrated heating element 11 disposed beneath said tank.

The asphalt material may be liquefied under moderate heat, or in the entire absence of heat by using suitable vaporizable solvents, such as phenolic or naphtholic solvents.

If the dipping method of application of the material is employed, the tire is immersed in the liquefied plastic material to any desired depth; preferably, if the side walls of the tire are in good condition, the depth of immersion of the tire into the asphalt solution or liquid need not be greater than the area normally comprehended by the tire tread and the side abutments of the tread normally present. The level of the coating material may be kept constant by feeding fluid material from a central tank, (not shown) to any desired number of such immersion tanks.

The surfacing material may be applied by spraying, if desired; vinyl resins or cellulose plastics are among suitable plastics particularly adaptable for such spraying process.

Suitably mounted on shafts 14, 14a at opposite sides of tank 10, are rollers 12, 12a which bear against the tire, as shown. Said rollers may be employed for rotating the tire, pursuant to which they may be provided with any suitable motivating means for manual or power drive rotation. Said rollers are preferably drum-like and may have a curved and if desired, a configurated surface, which will result in giving a suitable arch form and a suitable tread pattern to the layer of plastic material applied to the tire.

I prefer to heat said rollers as by the electric heating units 15, 15a, schematically shown.

As the tire is rotated in its supporting structure, the rollers 12 and 12a raise the temperature of the rubber at the tread area of the tire to bring it to a suitable condition to receive plastic material. The tire picks up a film or layer of the plastic, and the rotation of the tire against the respective rollers 12, 12a maintains the plastic in a heated, although not necessarily liquid form, and aids to vaporize any solvent from the plastic. Under these conditions, the plastic material applied to the rubber of the tire is effectively bonded thereto, and after such application the applied material is allowed to set and harden.

The rotation of the tire carcass may be continued until the tire has acquired, and been bonded to, a suitable thickness of the coating material. To permit any desired thickness, the tire may be inflated to more or less degree, or the axis of the wheel may be raised or lowered with respect to the axes of the rollers 12, 12a.

The entire process may be accomplished, if desired, without removing the wheels from the car, by immersion, as shown, or by spraying the material with suitable spray apparatus, as later described.

Certain fibrous materials may be useful in strengthening the surfacing material; small strands of fine wire may be added to the surfacing material to improve the non-skid characteristics of the tread. Said fibrous or wire materials may be applied to the plastic material by a blower 16 which ejects the material from a hopper 17 and forcibly projects it against the surface R of the tire carcass through discharge tube 18.

The discharge of such reinforcing or non-skid material against the tire may be controlled to cause it to be deposited after a suitable thickness of surfacing material has been applied. The forcible projection of the fibre, under the pressure created by the blower 16, causes said fibre to be imbedded in the still plastic material. By positioning the discharge tube 18 in advance of roller 12, said roller "kneads" the fibre or non-skid material into the body of surfacing material.

The apparatus shown may be used alternatively, by which I mean that the hopper 17 may be employed as a reservoir of coating material for spraying the same against the tire, as by the blower means 16 and discharge 18 thereof. In such arrangement the fibrous material may be mixed with the plastic solution in tank 17, and any surplus material may be precipitated into the tank 10, which thereby serves as a container for salvage of such surplus plastic material.

Whereas I have described my invention by reference to specific forms thereof, it will be understood that many changes and modifications may be made provided they do not depart from the scope of the claims.

I claim:

1. Apparatus for retreading a tire carcass, comprising a vat containing fluid retreading material, means for rotatably supporting said tire for the immersion thereof in said retreading material to a predetermined depth, there being at least one roller disposed above said retreading material and arranged to be urged against said tire carcass for rolling said retreading material into intimate engagement with said tire carcass, and means for forcibly blowing predetermined amounts of fibrous material against said retreading material prior to the solidification of said material.

2. Means for resurfacing rubber tires, comprising means for rotatably supporting said tire, means for spraying a resurfacing compound against said tire, and roller means for pressing said resurfacing compound into intimate engagement with said tire while rotating said tire.

3. Means for resurfacing rubber tires, comprising means for rotatably supporting said tire, roller means in engagement with that portion of the tire to be resurfaced, means for ejecting resurfacing material from a reservoir against said tire in advance of said roller means, a tank to receive surplus resurfacing material and to create a second reservoir of said resurfacing material into which a portion of said tire may be immersed, and a second roller operatively associated with said tire to press into bonding engagement with said tire any surfacing material which may have been picked up by said tire during its immersion in said second reservoir.

JESSE D. LANGDON.

REFERENCES CITED

The following references are of record in the file of this patent:

UNITED STATES PATENTS

| Number | Name | Date |
| --- | --- | --- |
| 1,182,669 | Flaherty | May 9, 1916 |
| 1,645,534 | Judkins | Oct. 18, 1927 |
| 2,076,451 | Fallscheer | Apr. 6, 1937 |
| 1,920,720 | Thurman et al. | Aug. 1, 1933 |
| 2,009,599 | Woock | July 30, 1935 |
| 2,139,619 | Howell | Dec. 6, 1938 |
| 2,204,466 | Barnes | June 11, 1940 |
| 1,354,992 | Nestler | Oct. 5, 1920 |
| 1,537,456 | Brown | May 12, 1925 |
| 1,185,365 | Brown et al. | May 30, 1916 |
| 1,290,576 | Kendall | Jan. 7, 1919 |

FOREIGN PATENTS

| Number | Country | Date |
| --- | --- | --- |
| 2,562 | Great Britain | 1884 |
| 172,162 | Great Britain | Dec. 8, 1921 |